United States Patent [19]

O'Neal

[11] 3,716,243

[45] Feb. 13, 1973

[54] CARTRIDGE LOCKING MECHANISM

[75] Inventor: Donald V. O'Neal, Rivergrove, Ill.

[73] Assignee: Motorola, Inc., Franklin Park, Ill.

[22] Filed: Jan. 18, 1971

[21] Appl. No.: 107,201

[52] U.S. Cl. .......... 274/4 B

[51] Int. Cl. .......... G11b 5/00

[58] Field of Search .......... 274/4 R, 4 B, 11 R, 11 B; 179/100.2 Z

[56] References Cited

UNITED STATES PATENTS

| | | | |
|---|---|---|---|
| 3,485,500 | 12/1969 | Loeschner et al. | 274/11 B |
| 3,221,963 | 12/1965 | Andersen | 274/4 F |
| 3,610,497 | 10/1971 | Ban | 274/4 B |
| 3,599,985 | 8/1971 | Huber | 274/4 B |

*Primary Examiner*—Harry N. Haroian
*Attorney*—Vincent Rauner and R. J. La Porte

[57] ABSTRACT

A cartridge locking mechanism for a tape player having a tunnel for receiving a tape cartridge, comprises an actuator arm mounted for movement in the direction of insertion and withdrawal of the cartridge in the tunnel and a plunger mounted for movement into and out of the tunnel in accordance with the movement of the actuator arm for receipt in a groove in the cartridge wall to secure the cartridge in the tunnel. The actuator arm includes a portion extending into the tunnel in the path of the cartridge for engagement therewith. The arm is resiliently biased toward the open end of the tunnel and includes a key-hole shaped aperture therein. The plunger passes through the key-hole aperture and is captured normally in the smaller portion thereof, out of the tunnel. The plunger, being resiliently biased toward the tunnel is prevented from movement thereinto. When a cartridge is inserted into the tunnel, the extension portion of the actuator arm is engaged by the cartridge, moving the actuator arm to align the larger portion of the key-hole aperture with the plunger, permitting the latter to pass therethrough and into the groove in the cartridge wall. Removal of the cartridge forces the plunger out of the groove and permits the actuator arm to spring back to its normal position, recapturing the plunger.

12 Claims, 4 Drawing Figures

PATENTED FEB 13 1973

3,716,243

INVENTOR
DONALD V O'NEAL

BY Ronald J. LaPorte
ATTORNEY

CARTRIDGE LOCKING MECHANISM

BACKGROUND OF THE INVENTION

This invention relates generally to a cartridge type tape player including a locking mechanism for securing a cartridge therein and more particularly to a locking mechanism for use in a tape player to removably secure therein a cartridge having a groove or notch formed along an edge thereof.

It is desirable in a tape player of the above-described type wherein cartridges are inserted for playback, to include means for firmly securing the cartridge in the player in engagement with instrumentalities for driving the tape through the cartridge and for playing the tape. This is especially true in the case of players mounted in automobiles where there is a greater chance that a cartridge will become dislodged from the player due to jarring caused by the movement of the automobile.

In the past, many of the mechanisms for securing tape cartridges in position in tape players have been complex in design and opeation, or ineffective and/or expensive to fabricate.

SUMMARY OF THE INVENTION

Accordingly, it is a primary object of the present invention to provide a new and improved locking mechanism for securing tape cartridges in a tape player.

It is another object of the invention to provide a locking mechanism of the last-mentioned type for use with a cartridge having a notch or groove formed along an edge thereof.

It is yet another object of the present invention to provide in a cartridge type tape player, a new and improved cartridge locking mechanism which is simple in construction, efficient in operation and relatively inexpensive to manufacture.

Briefly, a preferred embodiment of the locking mechanism according to the invention comprises an actuator arm mounted for sliding movement along a side surface of the chassis of a cartridge type tape player. A portion of the actuator arm extends inwardly into the cartridge receiving opening or tunnel of the tape player, into the path of a cartridge inserted thereinto. The actuator arm is normally spring biased toward the mouth or open end of the cartridge receiving tunnel.

A plunger is provided for movement into and out of the tunnel for receipt in the notch or recess formed in an edge of the cartridge to secure the latter in engagement with the driving and playing instrumentalities of the player. The plunger is spring biased toward the tunnel. The plunger passes through a key-hole provided in the actuator arm and is normally aligned with and captured in the smaller aperture portion of the key-hole to prevent the plunger from entering into the tunnel.

Upon insertion of a cartridge into the tunnel, the inwardly extending portion of the actuator arm is engaged thereby. Movement of the cartridge into the tunnel forces the actuator against the biasing spring to in turn align the plunger with the larger aperture portion of the key-hole in the actuator arm. When the latter occurs, the plunger springs into the tunnel toward the cartridge and is received in the groove formed therein.

Removal of the cartridge from the player slidably forces the plunger out of the groove and likewise permits the actuator arm to be returned to its normal position, whereby the plunger is recaptured in the smaller aperture portion of the key-hole.

The plunger includes a rounded head which slides smoothly over the edge of the cartridge during insertion and removal thereof into and out of the player, respectively.

DETAILED DESCRIPTION OF THE DRAWINGS

Figure 1:
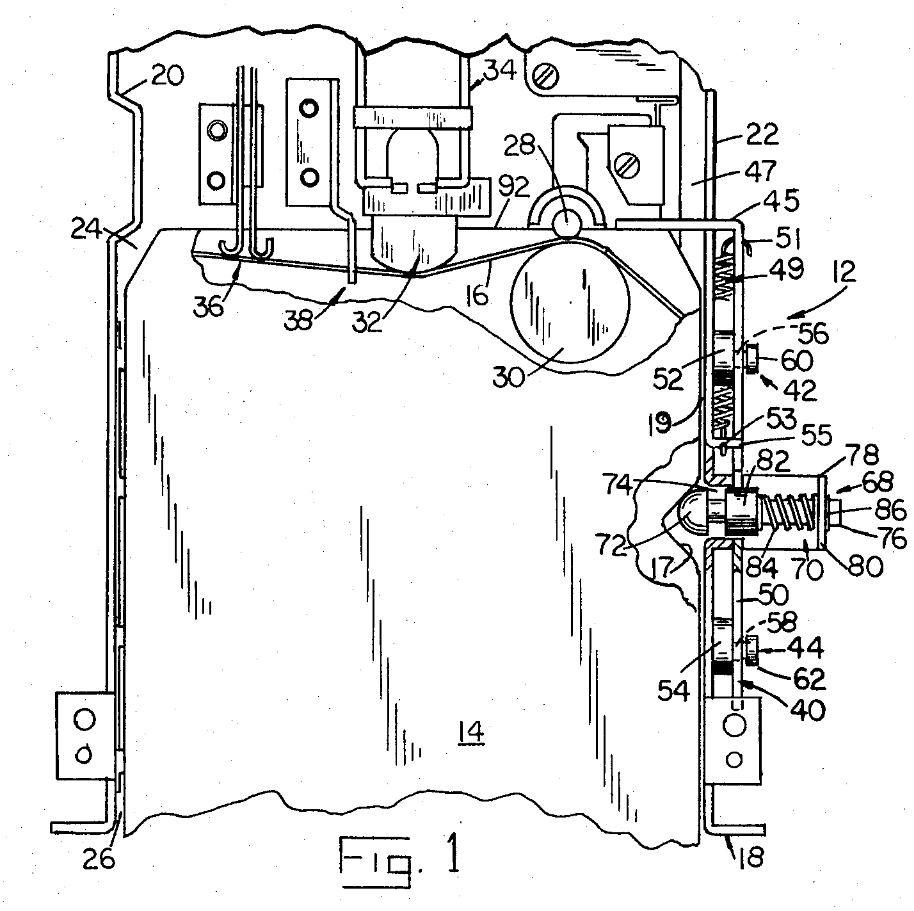
FIG. 1 is a top, plan view of a cartridge tape player including a cartridge locking mechanism according to the invention.

Referring now to the drawing in greater detail, FIG. 1 thereof illustrates a cartridge type tape player generally designated by the numeral 10, in which a cartridge locking mechanism 12 according to the invention is employed.

The cartridge tape player 10 is adapted to receive and play a tape cartridge 14 of the usual type having a recorded, multi-track tape 16 (FIG. 1) mounted therein and a notch or groove 17 formed along an edge 19 thereof.

The tape player 10 includes a chassis 18 including a pair of side walls 20, 22 interconnected by top and bottom walls (not shown) to form an opening or tunnel 24 having a mouth or open end 26 through which the cartridge 14 is received therein. Mounted on the chassis and in communication with the tunnel 24, is a capstan shaft 28 against which a pressure roller 30 mounted in the tape cartridge and over which the tape 16 passes, is pressed. The capstan shaft 28 is driven in the usual manner by a motor and pulley arrangement (not shown) to move the tape 16, sandwiched between the capstan shaft and the pressure roller 30, through the cartridge and past a magnetic tape head, 32, also mounted on the chassis 18 in communication with the cartridge receiving tunnel 24.

The magnetic tape head is mounted on chassis 18 by means of a bracket arrangement 34, designed to move the tape head in a plane adjacent the tape 16 in a direction transverse the movement of the tape for the purpose of selectively playing certain ones of the various tracks on the tape. Apparatus (not shown) is provided to automatically position the magnetic tape head with respect to the various tape tracks in response to the detection by a set of contacts 36 mounted adjacent the tape head 32 in engagement with tape 16 of conductive strips (not shown) on the magnetic tape.

A tape guide 38 also mounted on chassis 18, is provided to insure the alignment of tape 16 with tape head 32 as the tape passes adjacent thereto.

The cartridge locking mechanism 12 is mounted on side wall 22 of the chassis of the tape player adjacent the notched or grooved edge 19 of a cartridge received in tunnel 24.

The locking mechanism 12 comprises an L-shaped actuator arm 40 mounted for movement along side wall 22 on a pair of guide posts 42, 44 attached to and extending outwardly from wall 22. The short leg 45 of arm 40 extends through an opening 47 into tunnel 24 into the path of a cartridge to be received therein. A pair of spaced elongated slots 46, 48 is provided in the longer leg 50 of the L-shaped arm 40 for engagement with a respective one of the guide posts 42, 44.

The actuator arm 40 rests on the lower base portions 52, 54 of guide posts 42, 44 and slides therealong in the direction of insertion and withdrawal of a cartridge into and out of the tunnel, respectively. A biasing spring 49 is attached at one end 51 to actuator arm 40 and at the opposite end 53 to a raised or bent tab portion 55 of wall 22 of the chassis, to urge arm 40 toward the open end 26 of tunnel 24.

Figure 2:
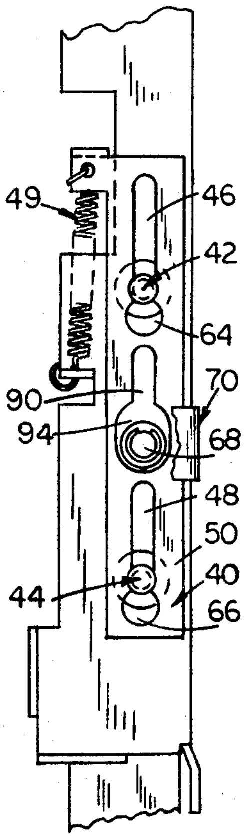
FIG. 2 is a side view of the cartridge locking mechanism of FIG. 1.

Narrower shank portions 56, 58 of guide posts 42, 44, respectively, pass through elongated slots 46, 48, respectively, provided in leg 50 of actuator arm 40 to guide the actuator arm as it is moved along wall 22. Heads 60, 62 of the guide posts, which as shown in FIG. 2 are too large to pass through slots 46, 48, retain the actuator arm on wall 22.

Larger circular apertures 64, 66, each having a diameter of a size great enough to pass a respective head portion 60, 62 therethrough, are provided in leg 50 of actuator arm 40 in communication with slots 46, 48, respectively, for use in assembling the locking mechanism 12.

The above described mounting arrangement for actuator arm 40 is shown only as an example for the purpose of this presentation. Other suitable mounting arrangements may be used with equally good success and still fall within the scope of the present invention.

A plunger 68 is mounted on an L-shaped bracket 70 extending outwardly from the bottom or lower wall of the tape player chassis 18. The plunger extends perpendicularly to the plane of side wall 22 and leg 50 of actuator arm 40, and includes a head 72 movable through a channel or opening 74 in wall 22 of the chassis. A shank or stem portion 76 extends through an aperture 78 in an upwardly extending leg 80 (FIG. 1) of the mounting bracket 70. Spaced from head 72 is an enlarged body or shank portion 82 of plunger 68. A coil spring 84 mounted on the shank portion 76 of plunger 68 is held between enlarged body portion 82 and leg 80 of the bracket and resiliently biases the plunger toward the interior of tunnel 24. A retaining washer 86 prevents the plunger from becoming removed from leg 80.

Figure 3:
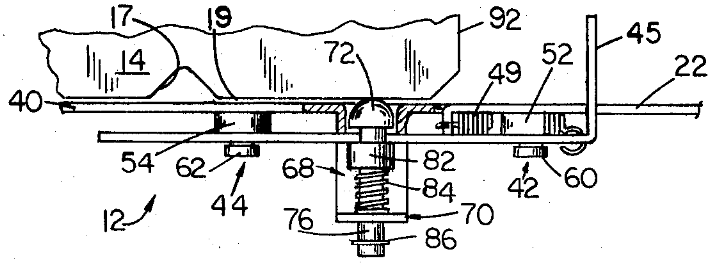
FIG. 3 is a top, sectional plan view of the cartridge locking mechanism of FIGS. 1 and 2 shown prior to the full insertion of a cartridge into the tape player.
Figure 4:
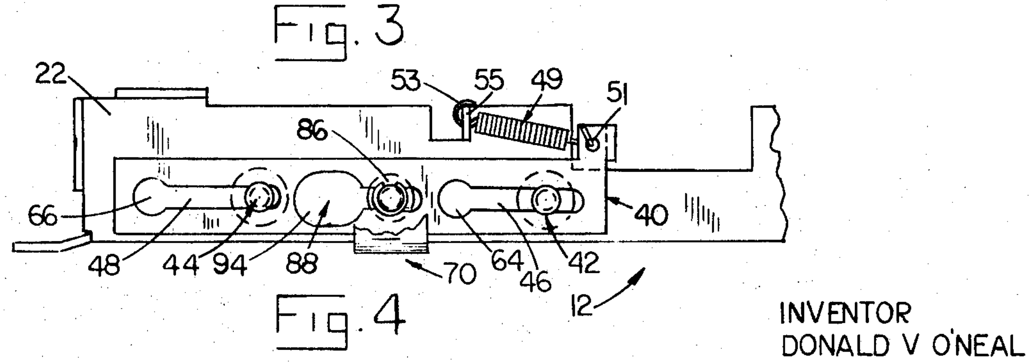
FIG. 4 is a side view of the cartridge locking mechanism of FIG. 3.

The plunger 68 also extends through a key-hole shaped slot or aperture 88 provided in leg 50 of actuator arm 40. Normally, in the condition where the cartridge is not present in or inserted fully into tunnel 24 of the tape player, the enlarged body or shank portion 82 of plunger 68 is positioned to the side of leg 50 of actuator arm 40 away from or opposite wall 22, and is aligned with the smaller opening 90 of key-hole slot 88 (see FIGS. 3 and 4) thereby capturing the plunger in a position whereby head 72 is prevented from extending into tunnel 24.

Upon insertion of a tape cartridge 14 into the open end 26 of tunnel 24, the front edge 92 of the cartridge engages the short leg 45 of actuator arm 40 extending into the path thereof. Insertion of the cartridge to its fully inserted position, (FIG. 1) causes actuator arm 40 to be moved against the force of biasing spring 49 until the larger opening 94 of key-hole aperture 88 is aligned with plunger 68, permitting enlarged body portion 82 to pass therethrough. The tension or biasing force provided by spring 84, moves plunger head 72 into engagement with the edge 19 of cartridge 14 and into V-shaped groove 17 therein. The force provided by plunger 68 against the cartridge 14, firmly secures the latter in a fully inserted position in tunnel 24 with roller 30 in driving engagement with capstan shaft 28 and tape 16 in contact with tape head 32.

Withdrawal of cartridge 14 from tunnel 24, causes plunger head 72 to be moved slidably along the surface of the V-shaped groove 17 and eventually out of the tunnel against the force of spring 84 until the enlarged body portion 82 of the plunger is returned to its normal position.

Withdrawal of the cartridge likewise permits the biasing spring 49 to return actuator arm 40 to its normal position, thereby recapturing the plunger in a position whereat the head thereof is maintained substantially outside of tunnel 24.

The actuator arm 40 and plunger 68 remain in their normal positions until the insertion of another cartridge into tunnel 24 occurs.

The cartridge locking mechanism according to the invention provides a simple, but efficient means to secure a tape cartridge in a tape player. The force provided by the spring loaded plunger is sufficient to secure a cartridge inserted into a tape player against the driving and playing instrumentalities thereof even when the player is mounted for use in an automobile being driven under the severest road conditions.

While a particular embodiment of the cartridge locking mechanism of the invention has been shown and described, it should be understood that the invention is not limited thereto since many modifications thereof may be made. It is therefore contemplated to cover by the present application any and all such modifications as fall within the true spirit and scope of the appended claims.

I claim:

1. A tape player for playing a cartridge having a recording tape mounted therein for movement therethrough, said tape player comprising an open-ended tunnel for receiving said cartridge, means for driving the tape within said cartridge when the cartridge is inserted into said tunnel, a magnetic tape head engageable with said tape when said cartridge is in the inserted position in said tunnel for playing said tape, and a cartridge locking mechanism comprising an actuator arm mounted for movement toward and away from the open-end of said tunnel in accordance with the insertion and withdrawal, respectively, of a cartridge in the tunnel, a plunger mounted for independent movement transverse the movement of said actuator arm, into and out of said tunnel, said plunger being resiliently biased toward said tunnel and means coupled to said actuator arm for engaging said plunger while no cartridge is present in said tunnel to hold said plunger against said resilient biasing force out of said tunnel, said means releasing said plunger to permit movement thereof into said tunnel for engagement with said cartridge in response to the insertion of said cartridge into said tunnel.

2. A tape player as claimed in claim 1 wherein said means coupled to said actuator arm includes a portion of the latter defining a slot formed therein, having small and large interconnected aperture portions, wherein said plunger passes through said slot and is normally aligned with and captured in the small aperture portion of said slot, outside of said tunnel, and wherein upon the movement of said actuator arm in response to the insertion of said cartridge into said tunnel, said plunger is aligned with the large aperture portion of said slot and passes therethrough into said tunnel.

3. A tape player as claimed in claim 2 wherein said actuator arm is resiliently biased toward the open end of said tunnel, whereby upon withdrawing said cartridge from said tunnel said actuator arm is returned to its initial position.

4. A cartridge locking mechanism for use in a tape player having an open ended tunnel for receiving a tape cartridge, and instrumentalities for driving and playing the recording tape in said cartridge upon the insertion of said cartridge into said tunnel, said cartridge locking mechanism comprising: an actuator arm mounted for movement in the direction of insertion and withdrawal of said cartridge in said tunnel, said actuator arm including a portion extending into said tunnel in the path of a cartridge to be received therein, and normally being resiliently biased toward the open end of said tunnel, a plunger mounted for independent movement in a direction transverse the movement of said actuator arm, into and out of said tunnel, said plunger being resiliently biased in a position extending into said tunnel, and means included on said actuator arm engaging said plunger to maintain the latter in a position outside of said tunnel against the biasing force applied thereto while said actuator arm is in its normal position said means releasing said plunger upon insertion of a cartridge into said tunnel in engaging relation with the extension of said actuator arm, whereby said plunger is released for engagement with said cartridge to maintain the latter in the inserted position in said tunnel.

5. A cartridge locking mechanism as claimed in claim 4 wherein said actuator arm is L-shaped with the short leg of the L extending into said tunnel, wherein said engaging means include a portion of said actuator arm defining a key-hole aperture in the long leg thereof through which said plunger extends, said plunger normally being aligned with the small aperture portion of the keyhole and being captured therein to prevent movement of said plunger into said tunnel, said actuator arm being moved in response to the insertion of said cartridge into said tunnel so that the large aperture portion of said keyhole is aligned with said plunger, thereby permitting the passage of the latter into said tunnel for engagement with said cartridge.

6. A cartridge locking mechanism as claimed in claim 5 for use with a cartridge including a recess formed therein, wherein said plunger enters said recess upon insertion of said cartridge into said tunnel and wherein withdrawal of said cartridge forces said plunger against the biasing force applied thereto and out of said recess, permitting the return of said actuator arm to its normal position, thereby to recapture said plunger in the small aperture portion of said keyhole.

7. A cartridge locking mechanism for use in a tape player having a chassis formed of interconnected side, top and bottom walls, a first end of said chassis being open to provide a tape cartridge receiving tunnel, and instrumentalities mounted on said chassis and communicating with said tunnel for driving and playing a recording tape in a cartridge received in said tunnel, said cartridge locking mechanism comprising: an actuator arm mounted on a side wall of said chassis for movement toward and away from the open end of said tunnel, in accordance with the insertion and withdrawal, respectively, of a cartridge into and out of said tunnel, a plunger mounted for independent movement into and out of said tunnel through an aperture in said side wall of said chassis and being resiliently biased in a position extending into said tunnel, and means coupled to said actuator arm for holding said plunger in a position out of said tunnel when said cartridge is in the withdrawn position, said means releasing said plunger for movement into said tunnel and engagement with said cartridge upon the insertion of said cartridge into said tunnel.

8. A cartridge locking mechanism as claimed in claim 7 wherein aid cartridge includes a groove formed along a side thereof positioned adjacent said side wall of said chassis for receipt of said plunger therein upon insertion of said cartridge into said tunnel.

9. A cartridge locking mechanism as claimed in claim 8 wherein said actuator arm is resiliently biased toward the open end of said tunnel so that upon removal of said cartridge from said tunnel said actuator arm is returned to its normal position and wherein said plunger has a smooth, rounded head portion which is received in said groove, and wherein upon removal of said cartridge from said tunnel said head portion is forced from within said groove against the biasing force applied against said plunger, whereby said plunger holding means is operative to again hold said plunger out of said tunnel.

10. A cartridge locking mechanism as claimed in claim 9 wherein said actuator arm includes a portion extending into said tunnel for engagement with the cartridge upon the insertion of the latter into said tunnel.

11. A cartridge locking mechanism as claimed in claim 10 wherein said actuator arm is mounted for sliding movement along said side wall of said chassis, wherein said chassis includes a pair of guide posts extending from said side wall and wherein said actuator arm includes a pair of elongated slots each one of said slots receiving a guide post to facilitate the movement of the actuator arm thereon along said wall.

12. A cartridge locking mechanism as claimed in claim 11 wherein said holding means includes a portion of said actuator arm defining a key-hole aperture therein through which said plunger passes, said plunger having a shank with an enlarged body portion provided thereon, the body portion being greater in dimension than the small opening of the keyhole and smaller in dimension than the large opening of the keyhole, said body portion normally being aligned and captured in said small portion of the keyhole thereby to maintain said plunger outside of said tunnel, said actuator arm being moved in response to the insertion of a cartridge into said tunnel to align the large opening portion with said plunger, thereby to permit passage of said body portion therethrough so that said plunger engages said cartridge.

* * * * *